United States Patent
Kjær

(10) Patent No.: US 10,044,186 B2
(45) Date of Patent: Aug. 7, 2018

(54) AC AND DC ELECTRICITY TRANSMISSION USING A MULTIPLE-CORE CABLE

(71) Applicant: VESTAS WIND SYSTEMS A/S, Aarhus N (DK)

(72) Inventor: Philip Carne Kjær, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 102 days.

(21) Appl. No.: 14/911,180

(22) PCT Filed: Jul. 15, 2014

(86) PCT No.: PCT/DK2014/050223
§ 371 (c)(1),
(2) Date: Feb. 9, 2016

(87) PCT Pub. No.: WO2015/018418
PCT Pub. Date: Feb. 12, 2015

(65) Prior Publication Data
US 2016/0197475 A1 Jul. 7, 2016

(30) Foreign Application Priority Data
Aug. 9, 2013 (DK) .................................. 2013 70439

(51) Int. Cl.
*H02J 3/02* (2006.01)
*H02J 3/38* (2006.01)

(52) U.S. Cl.
CPC ................ *H02J 3/02* (2013.01); *H02J 3/386* (2013.01); *Y02E 10/763* (2013.01)

(58) Field of Classification Search
CPC .................................... H02J 3/02; H02J 3/386
See application file for complete search history.

(56) References Cited

U.S. PATENT DOCUMENTS 3,454,783 A * 7/1969 Hunt ........................ H02J 1/08
174/110 R
3,461,218 A * 8/1969 Buchhold .............. H01B 12/12
174/13

(Continued)

FOREIGN PATENT DOCUMENTS

CN 101515039 A 8/2009
DE 105982 C 10/1898

(Continued)

OTHER PUBLICATIONS

NEC, "National Electrical Code," 2011, pp. 1-11.*

(Continued)

*Primary Examiner* — Thienvu Tran
*Assistant Examiner* — Pinping Sun
(74) *Attorney, Agent, or Firm* — Patterson + Sheridan, LLP

(57) ABSTRACT

A conventional cable comprises three conductive cores, each provided with a respective conductive sheath which are together housed within an outer insulating sheath. The three-core cable is used to transmit electric power in the form of dc current and single-phase ac current. A first one of the conductive cores is used to transmit dc current, while a second conductive core is used to transmit the return dc current. The third conductive core is used to transmit the single-phase ac current. The return ac current is transmitted along all three conductive outer sheaths in parallel. The cable is used to transmit dc current from a wind turbine generator to a substation where it is converted to ac before connecting to the mains electricity grid. The ac current is used to power auxiliary circuitry of the wind turbine generator when the output of the turbine generator falls below a give value.

11 Claims, 2 Drawing Sheets

(56) References Cited

U.S. PATENT DOCUMENTS

Figure 1:
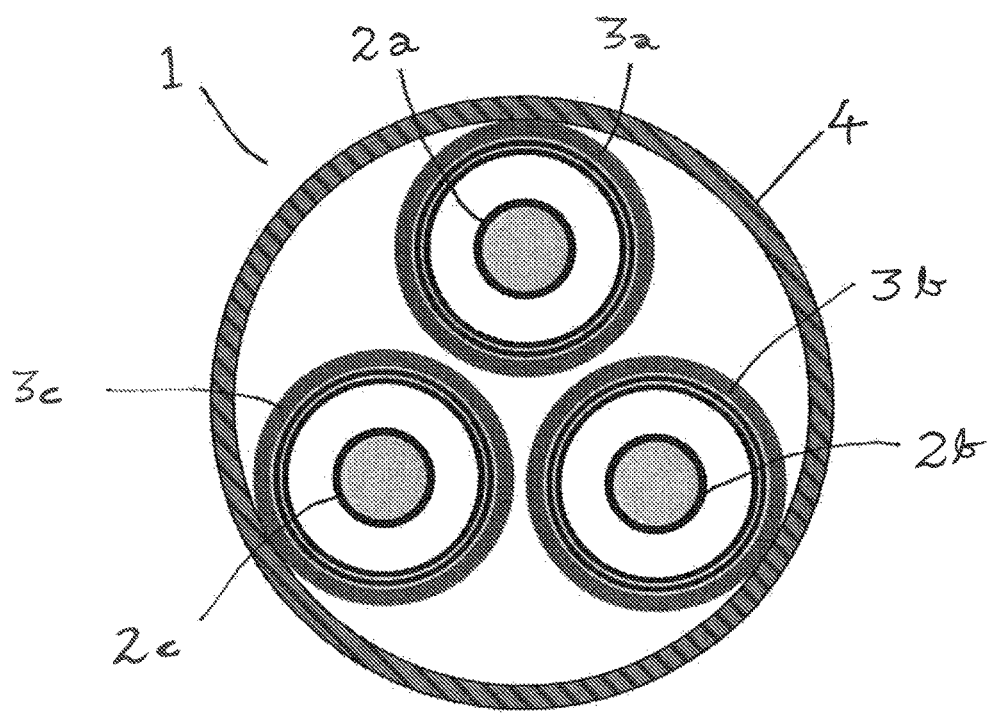

| | | | | |
|---|---|---|---|---|
| 3,808,351 | A | * | 4/1974 | Moisson-Franckhauser ........ H01B 12/16 174/15.5 |
| 3,975,617 | A | * | 8/1976 | Othmer ................. H05B 6/108 137/341 |
| 4,117,528 | A | * | 9/1978 | Bolin ....................... H01T 4/08 218/68 |
| 5,952,614 | A | * | 9/1999 | Ries ......................... H01B 7/30 174/106 R |
| 7,723,616 | B2 | * | 5/2010 | Hirose ................... H01B 12/06 174/125.1 |
| 2004/0216915 | A1 | | 11/2004 | Hirose |
| 2007/0013193 | A1 | | 1/2007 | Galloway et al. |
| 2008/0217995 | A1 | * | 9/2008 | Hirose ..................... H02J 1/00 307/1 |
| 2011/0140511 | A1 | | 6/2011 | Larsen |
| 2013/0154262 | A1 | | 6/2013 | Tripathi et al. |
| 2014/0225369 | A1 | * | 8/2014 | Bodewes .................. F03D 7/04 290/44 |

FOREIGN PATENT DOCUMENTS

| | | |
|---|---|---|
| EP | 1860667 A1 | 11/2007 |
| EP | 2065901 A2 | 6/2009 |
| JP | 2002124141 A | 4/2002 |
| WO | 2006098069 A1 | 9/2006 |
| WO | 01/084689 A1 | 8/2011 |

OTHER PUBLICATIONS

International Search Report for PCT/DK2014/050223, dated Dec. 18, 2014.

Danish Search Report for PA 2013 70439, dated Mar. 25, 2014.

\* cited by examiner

AC AND DC ELECTRICITY TRANSMISSION USING A MULTIPLE-CORE CABLE

The present invention relates to methods of transmitting electric power, and in particular to methods of transmitting electric power to and/or from wind turbine generators.

Wind turbine generators are conventionally arranged to generate three-phase ac power at a variable voltage and a variable frequency in dependence on wind speed. In order to transmit the generated power to the mains electricity grid, the voltage and the frequency of the generated power must both be converted to well-defined values suitable for the grid. To achieve this, the three-phase ac current generated by the wind turbine is first converted to a dc current and subsequently converted to three-phase ac current at the voltage and frequency of the grid. This conversion typically occurs within the wind turbine generator housing.

Wind turbine generators typically require auxiliary circuits to perform various safety and maintenance functions, and these are usually powered with ac current. When the wind turbine generator is operational, the auxiliary circuits are powered from the generator. However, when the wind turbine generator is not generating power, the auxiliary circuits are supplied with power using ac current from the mains grid.

Three-core sheathed cables, laid either along the sea floor or along or beneath the ground, are used to transmit the three respective phases of the ac current to or from the grid, and each outer sheath is used only to conduct small amplitudes of current during imbalanced operation and to conduct short durations of fault currents.

It has been proposed to build wind turbine generators which generate medium-voltage dc power, and the dc power would then be transmitted from the turbines to a substation for converting the generated medium-voltage dc power, first to high-voltage dc power and then to ac power suitable for transmission within the mains grid. Such an arrangement is expected to result in a substantial cost savings. In particular, the level of power which can be transmitted using dc current on two cables is higher than that which can be transmitted using three-phase ac current on three such cables, for the same temperature rise and conductor cross-section.

In order to connect such dc wind turbine generators to the substations and grid, it would be necessary to provide cabling suitable for the transmission of dc current, for transmitting dc power to and from the grid. However, replacing the three-core three-phase ac current cables with specially designed medium-voltage dc cables would require heavy investment.

Furthermore, with such a system, the auxiliary circuits would still require ac power. Although, in this case it would be possible to provide each wind turbine generator with a dedicated dc-ac power converter to provide the necessary ac power for the auxiliary circuits, such converters are expensive, and it would therefore be desirable to provide an arrangement which does not require a converter. This could be achieved, for example, by transmitting ac power from the grid back to the wind turbine generator in order to power the auxiliary circuits.

However, in this case, the cabling would be required not only to transmit dc power to and from the wind turbine generator but also to transmit ac power from the grid to the auxiliary circuits of the wind turbine generator.

Both the material for such additional cabling and the labour involved in laying the cable would be expensive, and it would therefore be desirable to provide a cheaper alternative.

Therefore, in accordance with the present invention there is provided a method of using a three-core cable for transmission of both dc and ac power, the method comprising: transmitting dc current along a first core; transmitting the return dc current along a second core; and transmitting ac current along the third core.

In this way, use can be made of existing cables which have been used to transmit three-phase ac current both to and from the wind turbine generators.

At least one of the three cores is preferably provided with a conductive sheath, and the method comprises transmitting the return ac current along the at least one conductive sheath. In the preferred arrangement, each of the three cores is provided with a conductive sheath, and the method comprises transmitting the return ac current along all three conductive sheaths in parallel. This arrangement takes into account the fact that conductive sheaths normally have lower current-carrying capacity than the conductive cores, and therefore provides for only a third of the return ac current to be transmitted along each outer sheath.

In the preferred embodiment, in which the three-core cable is used to transmit power to and from a wind turbine generator, and in which the auxiliary circuits are supplied with low-level ac power, it will be appreciated that the three sheaths, in combination, will have sufficient current-carrying capacity for the return ac current.

Thus, in a further aspect of the present invention, the method comprises changing the use of a three-core cable from: (a) transmitting each phase of three-phase ac current along a respective core; to (b) transmitting dc current along a first core, and transmitting the return dc current along a second core. In this case, the use of the third core is preferably changed to transmitting single-phase ac current. Alternatively, the third core could be used as a neutral conductor, to retain all charge within the cable without requiring any external ground connection.

In preferred arrangements, the cable is used for transmitting ac power to the wind turbine generator, in which case the ac power can be used to power the auxiliary circuits. It will be appreciated that the magnitude of the ac current required to power the auxiliary circuits is substantially less than the ac power which would previously have been generated by the wind turbine and can therefore be transmitted as a single-phase supply along only a single conductor.

Figure 2:
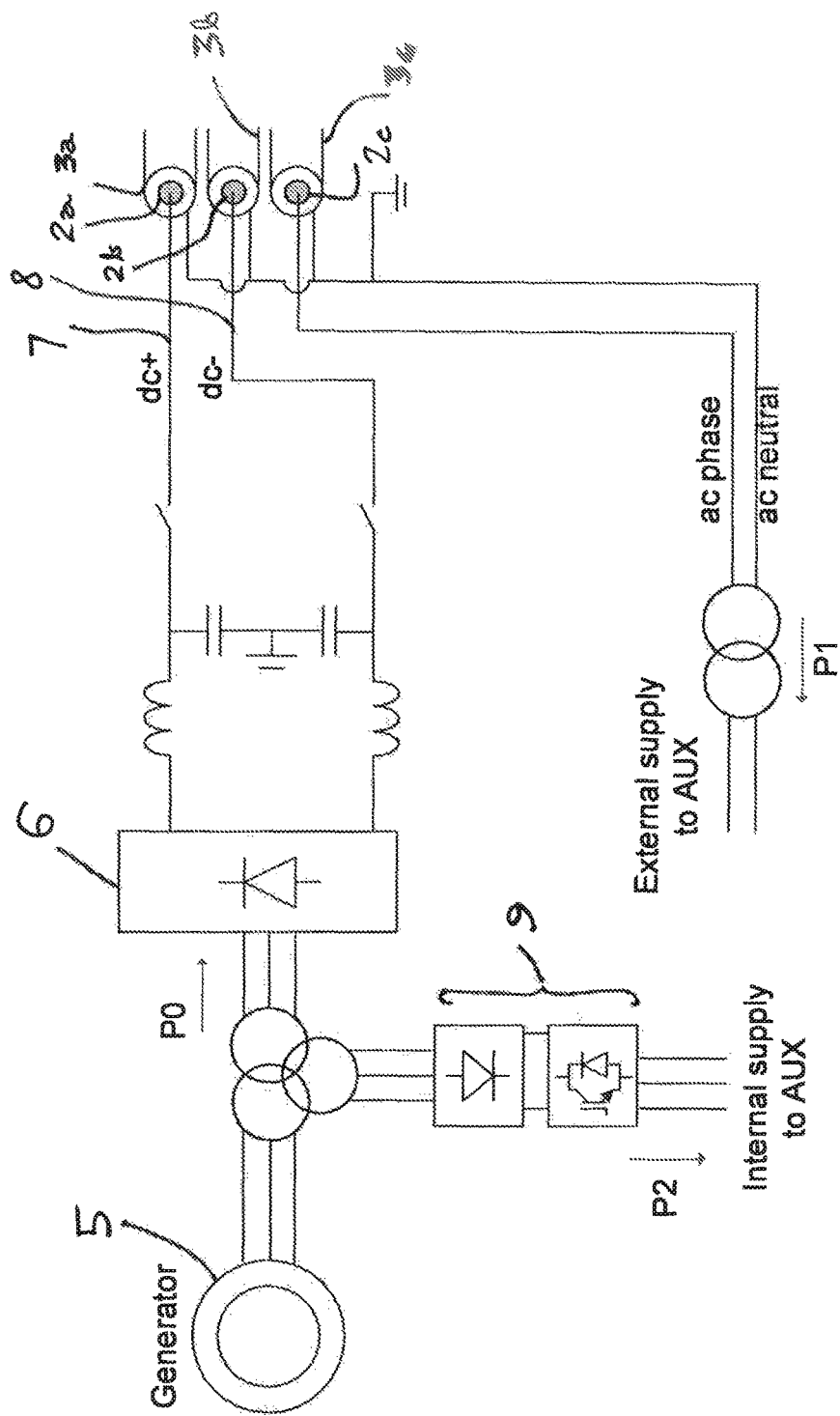

Preferred embodiments of the present invention will now be described with reference to the accompanying drawings, in which:

FIG. 1 illustrates a three-core cable for use in a method in accordance with a preferred embodiment of the present invention; and FIG. 2 illustrates the electrical connections between a wind turbine generator and the mains grid used in a method in accordance with a preferred embodiment of the present invention.

Referring to FIG. 1, a conventional cable 1 comprises three conductive cores 2a, 2b, 2c, each provided with a respective conductive sheath 3a, 3b, 3c, which are together housed within an outer insulating sheath 4. Such a cable 1 is conventionally used to transmit electric power in the form of three-phase ac current. Each of the three phases of the ac current is transmitted along a respective conductive core e.g. 2a, and the return ac current is transmitted along the outer conductive sheath 3a associated with the conductive core 2a.

In the preferred embodiment of the present invention, the three-core cable 1 is used to transmit electric power in the form of dc current and single-phase ac current. A first one of the conductive cores 2a is used to transmit dc current, while a second conductive core 2b is used to transmit the return dc current. The third conductive core 2c is used to transmit the single-phase ac current. The return ac current is preferably transmitted along all three conductive outer sheaths 3a, 3b, 3c in parallel, but may alternatively be transmitted along only a single outer sheath, e.g. 3a.

Referring to FIG. 2, a wind turbine generator 5 generates electric power in the form of three-phase ac current of variable voltage and frequency. This ac current is rectified using a diode rectifier 6 to create an output dc voltage across two terminals 7, 8 which are connected respectively to the first and second conductive cores 2a, 2b of the three-core cable 1 described above with reference to FIG. 1.

The three-phase ac current generated by the wind turbine 5 is also supplied to a converter 9 which converts the variable voltage and variable frequency output into a dc current and subsequently to an ac current of fixed voltage and frequency suitable for powering auxiliary circuitry (not shown) required for the maintenance of the wind turbine generator 5.

Since the auxiliary circuitry may be required to be powered even when the output of the wind turbine generator 5 falls below a certain threshold, or is not generating any output, an additional source of ac power is obtained from the mains grid via the third conductive core 2c of the cable 1. As described above, the return ac current is supplied in parallel to the three conductive sheaths 3a, 3b, 3c of the cable 1.

In this arrangement, the three-phase ac current output of the wind turbine generator 5 which has a variable voltage and a variable frequency can be converted to a dc current of fixed voltage and transmitted to a substation along existing cables which were originally intended to transmit three-phase ac current, thereby eliminating the need to replace the existing cables.

It will be appreciated that the invention has been described above with reference to a preferred embodiment and that modifications may be made without departing from the scope of the invention which is defined solely by the following claims.

What is claimed is:

1. A method of using a three-core cable for transmission of both direct current (DC) and alternating current (AC) power, the method comprising:
   transmitting DC current along a first core having a first conductive sheath;
   transmitting a return current of the DC current along a second core having a second conductive sheath;
   transmitting AC current along a third core having a third conductive sheath; and
   transmitting a return current of the AC current along the first conductive sheath, the second conductive sheath, and the third conductive sheath in parallel.

2. The method of claim 1, wherein the cable is coupled with a wind turbine generator (WTG), and
   wherein the first core and the second core are used for one or both of: transmitting DC power to the WTG and transmitting DC power from the WTG.

3. The method of claim 2, wherein the third core, the first conductive sheath, the second conductive sheath, and the third conductive sheath are used for transmitting AC power to the WTG.

4. The method of claim 3, further comprising:
   providing the transmitted AC power for powering one or more auxiliary circuits of the WTG.

5. The method of claim 4, further comprising:
   providing generated AC power from the WTG for powering the one or more auxiliary circuits.

6. The method of claim 5, further comprising:
   converting the generated AC power to a predefined voltage and frequency for powering the one or more auxiliary circuits.

7. A method of changing the use of a three-core cable, the method comprising:
   in a first configuration, transmitting each phase of three-phase alternating current (AC) current along a respective core of the cable; and
   in a second configuration:
      transmitting DC current along a first core having a first conductive sheath;
      transmitting a return current of the DC current along a second core having a second conductive sheath;
      transmitting AC current along a third core having a third conductive sheath; and
      transmitting a return current of the AC current along the first conductive sheath, the second conductive sheath, and the third conductive sheath in parallel.

8. A wind turbine coupled with an electrical grid via a multiple-core cable, the wind turbine comprising:
   a generator configured to generate first alternating current (AC) power;
   a first convertor arrangement configured to:
      convert at least a first portion of the first AC power into direct current (DC) power; and
      provide the DC power to the electrical grid using a first core and a second core of the cable, wherein the first core has a first conductive sheath and the second core has a second conductive sheath; and
   one or more auxiliary circuits configured to:
      receive second AC power using a third core of the cable and using a parallel arrangement of the first conductive sheath, the second conductive sheath, and a third conductive sheath of the third core.

9. The wind turbine of claim 8, wherein the first AC power comprises three-phase AC power, and wherein the second AC power comprises single-phase AC power.

10. The wind turbine of claim 8, wherein the one or more auxiliary circuits are further configured to:
   receive a second portion of the first AC power.

11. The wind turbine of claim 10, further comprising:
   a second converter arrangement configured to convert the second portion of the first AC power to a predefined voltage and frequency for powering the one or more auxiliary circuits.

* * * * *